United States Patent Office 3,159,537
Patented Dec. 1, 1964

3,159,537
POTENTIATION OF TETRACYCLINE BY PHOSPHINIC ACID
Edward Takesue, Pearl River, and Joseph John Hlavka, New City, N.Y., and James Howard Boothe, Montvale, N.J., assignors to American Cyanamid Company, New York, N.Y., a corporation of Maine
No Drawing. Filed Dec. 20, 1960, Ser. No. 77,006
10 Claims. (Cl. 167—55)

The invention is concerned with improved compositions containing tetracycline antibiotics and other substances which serve to promote absorption under physiological conditions thus resulting in higher blood concentrations of antibiotic.

The use of the tetracycline antibiotics administered orally presents some problems where it is desired to have the antibiotic penetrate the blood stream, as in many cases there is considerable loss through poor absorption of antibiotic and thus only a portion appears in the blood.

In the past, various attempts have been made to increase the blood levels obtained by oral feeding of tetracycline antibiotics with various substances which have been generally referred to in the art as adjuvants. Typical of such substances are citric acid and its salts; various chelating agents, such as salts of ethylenediamine tetraacetic acid; various inorganic phosphates, and the like. Recently, terephthalic acid has been proposed as an adjuvant, more particularly when tetracyclines are incorporated in animal feeds, and glucosamine has been proposed for human use.

According to the present invention, we have found a group of compounds which serve to promote greater absorption of the antibiotic into the blood stream and exert a more powerful adjuvant action or potentiating effect than those which have been used heretofore.

One of the best classes of compounds useful in the present invention are certain organo oxyphosphorous compounds which may be represented by the following general formula:

$$(R)_2 \overset{O}{\underset{\|}{P}} - OH \qquad (I)$$

wherein R is a member of the group consisting of lower alkyl, hydroxylower alkyl, carboxylower alkyl, carbalkoxylower alkyl, cyanolower alkyl, cyanohydroxylower alkyl, carboxyhydroxylower alkyl radicals, carbalkoxyhydroxylower alkyl and hydroxyphenyllower alkyl radicals.

One of the best compounds of this class is bis(1-carboxy-1-hydroxyethyl) phosphinic acid, monohydrate otherwise known as 2,2'-phosphinicodilactic acid.

Another class of highly useful organo oxyphosphorous compounds are those organic phosphonic acids or esters which may be represented by the following general formula:

$$R - \overset{O}{\underset{\|}{P}}(OR_1)_2 \qquad (II)$$

wherein R is a member of the group consisting of phenyl, lower alkoxyphenyl, aminophenyl, halophenyl, hydroxyphenyl, dihydroxyphenyl, lower alkylphenyl, di-lower alkylphenyl, carboxyphenyl, dicarboxylphenyl, aralkyl, styryl, methylpropenyl, furyhydroxymethyl, hydroxy lower alkyl, allyl, and hydroxycarboxy lower aklyl radicals; and $R_1$ is a member of the group consisting of hydrogen and lower alkyl radicals and salts thereof.

Other useful compounds according to the present invention will be apparent from the detailed description hereinafter.

The chemical formulae of the adjuvants useful in the present invention are shown below and are numbered 1 to 40. For convenience these compounds will be referred to hereinafter with appropriate numbers rather than the name or the formula.

STRUCTURAL FORMULAE AND NAMES
OF USEFUL ADJUVANTS (1) Bis (1 - carboxy - 1 - hydroxyethyl)phosphinic acid monohydrate (2,2'-phosphinicodilactic acid)

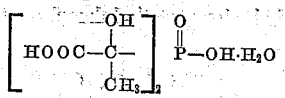

(2) Bis(1-hydroxy-1-methylethyl) phosphinic acid

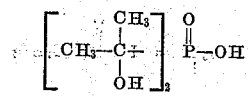

(3) Bis(1-hydroxy-2-methlpropyl)phosphinic acid

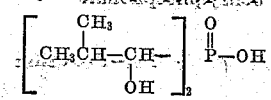

(4) Bis(2-carboxyethyl)phosphinic acid $$[HOOCCH_2CH_2-]_2\overset{O}{\underset{\|}{P}}-OH$$

(5) Bis(2-cyanoethyl)phosphinic acid $$[NC-CH_2CH_2-]_2\overset{O}{\underset{\|}{P}}-OH$$

(6) Bis(α-hydroxybenzyl)phosphinic acid

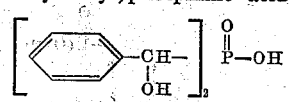

(7) Bis(hydroxymethyl)phosphinic acid $$[HOCH_2-]_2\overset{O}{\underset{\|}{P}}-OH$$

(8) Bis(1-carboxy-1-hydroxypropyl)phosphinic acid

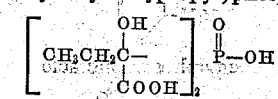

(9) Dioctylphosphinic acid $$(n-C_8H_{17})_2\overset{O}{\underset{\|}{P}}-OH$$

(10) (1-anilino-1-methylethyl)phosphinic acid

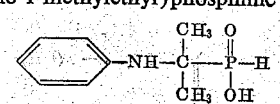

(11) 1,2,3,4,5,6-hexahydroxyhexyl phosphinic acid

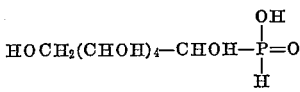

(12) Diethyl α-hydroxyfurfuryl phosphonate

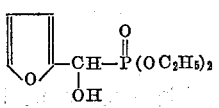

(13) Diethyl 1-hydroxyheptyl phosphonate

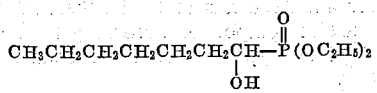

(14) Diethyl 1-hydroxypropyl phosphonate

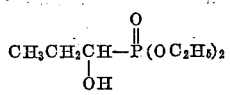

(15) Diethyl allylphosphonate

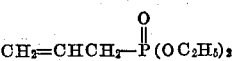

(16) Diethyl hydroxymethylphosphonate

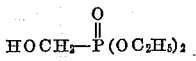

(17) Diethyl 2-methylpropenyl phosphonate

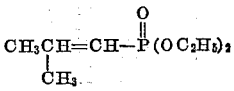

(18) Diethyl benzylphosphonate

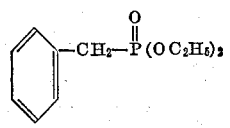

(19) Diethyl 2,5-dihydroxyphenyl phosphonate

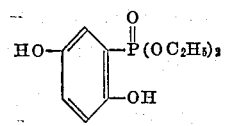

(20) 4-methoxyphenylphosphonic acid

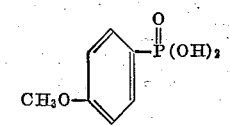

(21) p-Aminophenylphosphonic acid

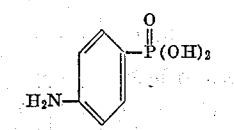

(22) p-Chlorophenylphosphonic acid

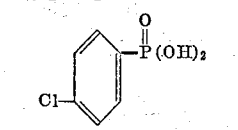

(23) Styrylphosphonic acid

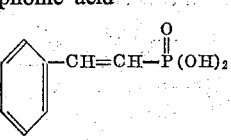

(24) Diethyl p-methoxyphenylphosphonate

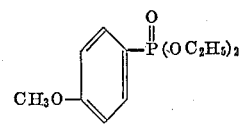

(25) Ethyl 4-chlorophenyl 2-methylpropenyl-phosphonate

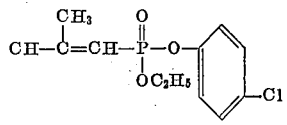

(26) 1-carboxy-1-hydroxyethyl phosphonic acid

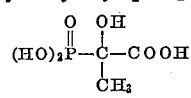

(27) Phosphonophthalic acid, monopotassium salt

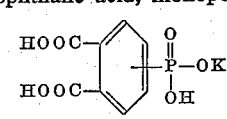

(28) Benzylphosphonic acid

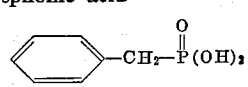

(29) Phenylphosphonic acid

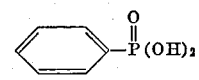

(30) 3,4-xylylphosphonic acid

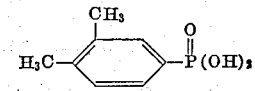

(31) Tris(2-carboxyethyl)phosphine hydrochloride (HOOCCH$_2$CH$_2$)$_3$P·HCl

(32) Bis(2-carboxyethyl) phenyl phosphine oxide

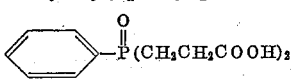

(33) 2-hydroxy-6-methyl-5-nitro cinchomeronic acid

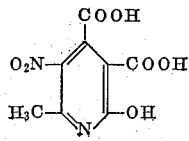

(34) 5-bromocinchomeronic acid

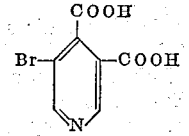

(35) Polyacrylic acid, molecular weight 250,000
Polyacrylic acid, molecular weight 50,000
Polyacrylic acid, molecular weight 10,000
Hydrolyzed polyacrylonitrile

(36) 2-amino-3-mercapto-3-methylbutyric acid

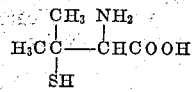

(37) Shikimic acid

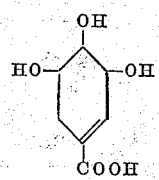

(38) Carboxymethylthiosuccinic acid

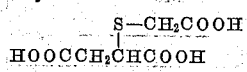

(39) N-cyanomethyl-5-sulfoanthranilic acid

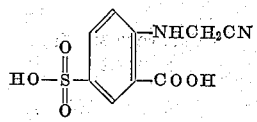

(40) 4-sulfophthalic acid

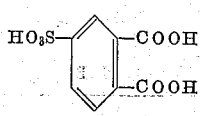

Certain of the adjuvants listed above are acidic compounds and are shown in the form of their free acids. They may be uesd equally as well in the form of their simple salts such as the alkali metal or ammonium salts.

In a particularly preferred embodiment of the present invention it is contemplated that tetracycline salts with the above adjuvants and particularly with the organo oxy-phosphorous compounds of the general Formula I above may be prepared and used as such. Because many of the above adjuvants are acidic in nature they can readily be combined in the form of a salt with a tetracycline antibiotic either as tetracycline free base or as an acid addition salt, i.e., the hydrochloride. Thus, for example, tetracycline phosphinicodilactate has been prepared by reacting equal mol quantities of tetracycline and 2,2'-phosphinicodilactic acid. This compound as well as other similar salts of therapeutically active tetracyclines has been found to be particularly useful in achieving higher blood levels than a simple mixture of tetracycline antibiotic and adjuvant.

In order to prepare such novel compositions of matter it is necessary merely to mix a tetracycline base with one of the described organo oxy-phosphorous compounds, for example, in an appropriate alcoholic solvent, e.g., isopropanol and heat to the boiling point of the solvent. The solution is then cooled and the novel tetracycline-acidic adjuvant salts precipitate. These novel salts are formed in equal mol ratios of organo oxy-phosphorous compounds and tetracycline antibiotic.

If desired, these novel compositions may have usefully added thereto a different adjuvant either alone or as a salt such as the sodium or ammonium salt thereof or with an added tetracycline antibiotic either as the free base or in the form of a different salt such as the hydrochloride. Also, if desired, different combinations of tetracycline antibiotics with one or more adjuvants may be prepared.

It is not known how the novel adjuvants operate to enhance the blood concentration of tetracycline antibiotics. They are chemically so widely different that it may well be that different mechanisms operate with different adjuvants. Their chemical differences are so marked that they are not in any sense chemically equivalent, their only equivalence being in the fact that they are all adjuvants and they all raise the blood concentration of tetracycline antibiotics. No theory as to why these diverse compounds opearte in this manner is advanced and it is not intended that the present inveniton be limited to any particular theory of action.

The compositions of the present invention include any of the tetracycline antibiotics, including tetracycline itself (abbreviated TC) and its salts, such as tetracycline hydrochloride (abbreviated TC·HCl); chlortetracycline (abbreviated CTC) and its salts, such as the hydrochloride; oxytetracycline (abbreviated OTC); demethylchlortetracycline (abbreviated DMCTC); demethyltetracycline (abbreviated DMTC) and various derivatives such as the following tetracycline compounds: 6-deoxytetracycline, 6-demethyl - 6 - deoxytetracycline, 7-bromo-6-demethyl-6-deoxytetracycline, 7 - chloro - 6 - demethyl-6-deoxytetracycline, 7-iodo-6-demethyl-6-deoxytetracycline, 7-nitro-6-demethyl-6-deoxytetracycline, 9-nitro-6-demethyl-6-deoxytetracycline, 7-bromo-6-deoxytetracycline, 7-iodo-6-deoxytetracycline, 9-nitro-6-deoxytetracycline, 7-nitro-6-doxytetracycline, 7-amino-6-demethyl-6-deoxytetracycline, 9-amino-6-demethyl-6-deoxytetracycline, 9-amino-6-deoxytetracycline, 9 - amino - 7-bromo-6-deoxytetracycline, 9-amino - 7-nitro-6-deoxytetracycline, 7-iodo-5-hydroxy-6-deoxytetracycline, 7 - bromo - 5-hydroxy-6-deoxytetracycline, 5-hydroxy-6-deoxytetracycline, 9-amino-7-bromo-6-demethyl - 6 - deoxytetracycline, 7 - bromo-9-nitro-6-demethyl-6-deoxytetracycline, 9-amino-7-chloro-6-demethyl-6-deoxytetracycline, 7-chloro-9-nitro-6-demethyl-6-deoxytetracycline.

The expression "tetracycline antibiotic" as used throughout the specification and claims is intended to embrace any of the foregoing tetracycline compounds. It is to be understood that those tetracyclines which are commercial or potentially commercial drugs such as chlortetracycline, tetracycline, oxytetracycline, demethylchlortetracycline and demethyltetracycline are especially preferred because of their ready availability and demonstrated clinical usefulness.

The method of administering the compositions of the present invention to mammals is quite varied. Aqueous solutions may be employed and this modification includes the addition of the compositions of the present invention to water in the case of animals which obtain their water from a central source. The mixture of the two substances as a suspension or dispersion in highly flavored extracts or in solid form is also useful. Solutions for intravenous or solutions or suspensions for intramuscular administrations are possible. For example, the adjuvant and the tetracycline antibiotic with an inert excipient may be enclosed in hard- or soft-shell gelatin capsules or they may be compressed into tablets or incorporated with animal feeds. In general, the method of administering the compositions of the present invention does not depart from the conventional means of administering tetracycline antibiotics. This is an advantage of the present invention and the improved results are obtained without requiring a special technique of administration.

The preparation of tetracysline antibiotic to adjuvant may vary over fairly wide limits. Preferably the adjuvant is present in amounts ranging from 0.1 to 10 parts by weight, with optimum results being obtained in amounts of from 0.1 to 3 parts by weight.

A dosage unit form for oral administration to humans is most conveniently a powdered mixture of the antibiotic and the adjuvant enclosed in a gelatin capsule. A dosage unit form may contain from about 25 to 500 mg. of one of the desired tetracyclines with from 0.1 to 3 parts by weight or more of adjuvant. An inert diluent such as starch, sucrose, or magnesium stearate may be added if desired. A preferred composition consists of 150–250 mg. of a tetracycline antibiotic together with 100–500 mg. of an adjuvant in a soft gelatin capsule. Similarly, dosage unit forms of the novel tetracycline organo oxy-phosphorous salts may be prepared in any convenient manner and containing the requisite therapeutic dose of antibiotic. If desired, the compositions may be granulated and administered as such, or may be compressed into tablets suitable for oral administration. Also, if desired, a composition can be formulated into numerous pharmaceutical substances such as pediatric drops, elixirs, and various other conventional pharmaceutical forms of medication. These will be administered by the attending physician or veterinarian in accordance with the age and condition of the patient, nature of the disease and in view of the other considerations peculiar to the individual patient.

In the following examples, different controls are used in each case because comparison techniques for tetracycline antibiotics are considered most accurate when given in the same period. This standard procedure is followed in the examples and explain why there will be a variation in blood levels of animals used in control experiments. In each example, the important thing is not the absolute numerical value of the blood level, but the value of the blood level relative to the control in the particular example. In the examples, the abbreviations for the various tetracycline antibiotics set out above will be used to facilitate ease of understanding and the adjuvants will be abbreviated "Adj" followed by the number of the adjuvant substance.

EXAMPLE 1

Groups of the same number of albino rats, ranging in weight from 175 to 300 grams, were dosed orally with a solution or suspension of 50 mg./kg. of tetracycline hydrochloride via a feeding needle. Similar groups received a mixture of 50 mg./kg. of TC·HCl plus 140 mg./kg. of known adjuvants. The serum levels obtained four hours following administration are shown in the following table:

TABLE 1

| Substance | Dose, mg./kg. | Serum levels, mcg./ml. |
|---|---|---|
| TC·HCl | 50 | 4.98 |
| TC·HCl plus terephthalic acid | 50+140 | 5.37 |
| TC·HCl plus citric acid | 50+140 | 7.18 |
| TC·HCl plus glucosamine | 50+140 | 4.49 |

It will be noted that citric acid and terephthalic acid result in substantial increase in serum level but glucosamine, which has been used extensively, does not result in any significant difference.

EXAMPLE 2

The experimental conditions of Example 1 were repeated using fresh groups of rats and including a fresh control group. The results appear in the following table:

TABLE 2

| Substance | Dose, mg./kg. | Blood levels, mcg./ml. |
|---|---|---|
| TC·HCl | 50 | 4.70 |
| TC·HCl plus terephthalic acid | 50+140 | 7.29 |
| TC·HCl plus Adj 1 | 50+140 | 13.73 |

It will be noted that Adjuvant 1 gives a much greater blood level increase than does terephthalic acid and about three times the blood level of the control dosed with tetracycline hydrochloride alone.

EXAMPLE 3

The procedure of Example 1 was repeated with new groups of rats. The results appear in the following table:

TABLE 3

| Substance | Dose, mg./kg. | Blood levels, mcg./ml. |
|---|---|---|
| TC·HCl | 50 | 5.83 |
| TC·HCl plus Adj 1 | 50+140 | 13.23 |

It will be noted that very substantial increases in blood level resulted from Adjuvant 1.

EXAMPLE 4

The procedure of Example 1 was repeated testing other adjuvants. The results appear in the following table:

TABLE 4

| Substance | Dose, mg./kg. | Blood levels, mcg./ml. |
|---|---|---|
| TC·HCl | 50 | 6.38 |
| TC·HCl plus Adj 27 | 50+140 | 13.24 |
| TC·HCl plus Adj 11 | 50+140 | 13.37 |

It will be noted that both Adjuvants 27 and 11 result in a substantial doubling of blood levels, even though here also the controls showed unusually high concentrations.

EXAMPLE 5

The procedure of Example 1 was repeated with a smaller amount of adjuvant. The results appear in the following table:

TABLE 5

| Substance | Dose, mg./kg. | Blood levels, mcg./ml. |
|---|---|---|
| TC·HCl | 50 | 4.87 |
| TC·HCl plus Adj 11 | 50+50 | 8.20 |
| TC·HCl plus Adj 1 | 50+50 | 13.94 |
| TC·HCl plus Adj 27 | 50+50 | 9.93 |

It will be apparent that there is a substantial increase with all of the adjuvants but Adjuvant 1 shows greater enhancement that any of the others.

EXAMPLE 6

The experimental conditions of Example 5 were repeated with larger groups of rats and included a large number of adjuvants together with the known citric acid, terephthalic acid and glucosamine. The results appear in the following table:

TABLE 6

| Substance | Dose | Blood level, mcg./ml. | Comparative ratio, TC=1 |
|---|---|---|---|
| TC·HCl | 50 mg./kg. | 1.38 | 1 |
| TC·HCl plus citric acid | 50 mg./kg. of each | 1.35 | 0.9 |
| TC·NCl plus terephthalic acid | 50 mg./kg. of each | 1.66 | 1.20 |
| TC·HCl plus glucosamine HCl | 50 mg./kg. of each | 1.87 | 1.35 |
| TC·HCl plus Adj. 29 | 50 mg./kg. of each | 2.06 | 1.49 |
| TC·HCl plus Adj 27 | 50 mg./kg. of each | 2.50 | 1.81 |
| TC·HCl plus Adj 1 | 50 mg./kg. of each | 3.88 | 2.81 |

It will be noted that the blood level increases follow the same pattern, but here citric acid is distinctly poorer than terephthalic acid and actually no better than the control, whereas glucosamine shows some increase.

EXAMPLE 7

That the inorganic salts of Adjuvant 1 elicit a response as great as the free acid is illustrated by the results given below, the experimental procedure followed being similar to Example 5.

TABLE 7

| Substance | Dose | 4 Hour Serum Levels, mcg./ml. |
|---|---|---|
| TC | 50 mg./kg | 2.60 |
| TC plus citric acid | 50 mg./kg. of each | 3.64 |
| TC plus Adj 1 | 50 mg./kg. of each | 6.08 |
| TC plus Adj 1 sodium salt | 50 mg./kg. of each | 5.17 |

As is apparent, both Adjuvant 1 and its sodium salt were very effective in increasing the absorption of tetracycline.

EXAMPLE 8

The procedure of Example 5 was repeated with the results appearing in the following table:

TABLE 8

| Substance | Dose, mg./kg. | Blood levels, mcg./ml. |
|---|---|---|
| TC·HCl | 50 | 3.32 |
| TC·HCl plus Adj 29 | 50+140 | 6.88 |
| TC·HCl plus Adj 30 | 50+140 | 6.85 |

EXAMPLE 9

The procedure of Example 5 was again followed with Adjuvant 1 and citric acid and two additional tetracyclines. The results appear in the following table:

TABLE 9

| Substance | Dose | Blood level, mcg./ml. |
|---|---|---|
| CTC | 10 mg./kg | 0.67 |
| CTC plus citric acid | 10 mg./kg. of each | 0.81 |
| CTC plus Adj 1 | 10 mg./kg. of each | 2.07 |
| OTC | 50 mg./kg | 0.83 |
| OTC plus citric acid | 50 mg./kg. of each | 0.86 |
| OTC plus Adj 1 | 50 mg./kg. of each | 2.17 |

EXAMPLE 10

The procedure of Example 5 was followed with Adjuvant 1 and several other tetracyclines. The results appear in the following table:

TABLE 10

| Substance | Dose | Mcg./ml. | | | | |
|---|---|---|---|---|---|---|
| | | 1 hr. | 3 hrs. | 5 hrs. | 7 hrs. | 24 hrs. |
| DMCTC | 50 mg./kg | 2.04 | 1.82 | 0.88 | 0.87 | 0.33 |
| DMCTC plus Adj 1 | 50 mg./kg. of each | 3.91 | 6.22 | 3.77 | 1.44 | 0.22 |
| DMTC | 50 mg./kg | 1.58 | 1.58 | 0.68 | 0.66 | 0.18 |
| DMTC plus Adj 1 | 50 mg./kg. of each | 3.08 | 2.85 | 1.94 | 0.78 | 0.22 |

It will be noted that in this example, blood levels at various hours after administration are taken and the different tetracyclines show a quite similar pattern of improved blood levels with Adjuvant 1.

EXAMPLE 11

Adjuvant 1 was tested in dogs, groups of three dogs being taken and a number of tetracyclines employed. Here again, as in the preceding example, blood levels at different hours appear. It will be noticed that the dose in the dogs is only half the relative dose in rats. The results are shown in the following table:

TABLE 11

| Substance | Dose | Mcg./ml. | | | |
|---|---|---|---|---|---|
| | | 1 hr. | 3 hrs. | 5 hrs. | 7 hrs. |
| TC·HCl | 25 mg./kg | 2.17 | 1.7 | 1.62 | 1.32 |
| TC·HCL plus Adj 1 | 25 mg./kg. of each | 8.12 | 6.73 | 6.12 | 4.35 |
| DMCTC | 25 mg./kg | 0.74 | 1.12 | 1.00 | 0.84 |
| DMCTC plus Adj 1 | 25 mg./kg. of each | 3.4 | 3.34 | 4.84 | 3.52 |
| DMTC | 25 mg./kg | 0.46 | 0.55 | 0.53 | 0.40 |
| DMTC plus Adj 1 | 25 mg./kg. of each | 4.32 | 7.25 | 7.22 | 4.5 |

EXAMPLE 12

The procedure of Examples 1 and 2 was repeated except that tetracycline sulfate was employed instead of tetracycline hydrochloride. The results are as follows:

TABLE 12

| Substance | Dose, mg./kg. | Blood levels, mcg./ml. |
|---|---|---|
| TC·H₂SO₄ | 50 | 2.93 |
| TC·H₂SO₄ plus citric acid | 50+140 | 7.7 |
| TC·H₂SO₄ plus Adj 1 | 50+140 | 11.3 |

It will be seen that the tetracycline sulfate when used with Adjuvant 1 gives substantially better results when compared with citric acid. The anion of tetracycline salts is not therefore particularly significant.

EXAMPLE 13

The procedure of Example 1 was repeated with a number of additional adjuvants and 50 milligrams of tetracycline hydrochloride per kilogram of body weight were used in each control test. The results appear in the following table:

TABLE 13

| Substance | Dose, mg./kg. | Serum levels, mcg./ml. | Mcg./ml. of TC·HCl on same test |
|---|---|---|---|
| TC·HCl plus Adj 20 | 50+140 | 9.54 | 3.16 |
| TC·HCl plus Adj 21 | 50+140 | 9.27 | 3.20 |
| TC·HCl plus Adj 22 | 50+140 | 10.56 | 6.20 |
| TC·HCl plus Adj 13 | 50+140 | 9.68 | 4.17 |
| TC·HCl plus Adj 5 | 50+140 | 8.92 | 4.01 |
| TC·HCl plus Adj 17 | 50+140 | 6.43 | 4.36 |
| TC·HCl plus Adj 19 | 50+140 | 6.88 | 4.36 |
| TC·HCl plus Adj 18 | 50+140 | 6.90 | 4.41 |
| TC·HCl plus Adj 25 | 50+140 | 9.08 | 4.41 |
| TC·HCl plus Adj 4 | 50+140 | 6.30 | 4.68 |
| TC·HCl plus Adj 23 | 50+140 | 7.98 | 3.74 |
| TC·HCl plus Adj 3 | 50+140 | 6.36 | 4.36 |
| TC·HCl plus Adj 2 | 50+140 | 8.64 | 4.02 |
| TC·HCl plus Adj 6 | 50+140 | 7.32 | 2.70 |
| TC·HCl plus Adj 14 | 50+140 | 5.76 | 4.02 |
| TC·HCl plus Adj 12 | 50+140 | 7.71 | 4.17 |
| TC·HCl plus Adj 15 | 50+140 | 7.96 | 3.10 |
| TC·HCl plus Adj 16 | 50+140 | 6.64 | 3.53 |
| TC·HCl plus Adj 7 | 50+140 | 8.62 | 3.26 |

EXAMPLE 14

The procedure of Example 5 was repeated using 50 milligrams of tetracycline per kilogram of body weight as the control and using 50 milligrams of tetracyline per kilogram of body weight and 50 milligrams of adjuvant per kilogram of body weight in the test compounds. The results obtained are shown in the table below:

TABLE 14

| Substance | Serum levels, mcg./ml. | Mcg./ml. of TC·HCl on same test |
|---|---|---|
| TC·HCl plus polyacrylic acid M.W. 10,000 | 6.32 | 3.56 |
| TC·HCl plus polyacrylic acid M.W. 50,000 | 5.75 | 3.56 |
| TC·HCl plus polyacrylic acid M.W. 100,000 | 5.85 | 3.56 |
| TC·HCl plus polyacrylic acid M.W. 250,000 | 6.89 | 3.56 |
| TC·HCl plus hydrolyzed polyacrylonitrile | 6.50 | 4.62 |
| TC·HCl plus Adj 31 | 3.92 | 2.70 |
| TC·HCl plus Adj 32 | 4.26 | 3.52 |
| TC·HCl plus Adj 39 | 4.65 | 2.02 |
| TC·HCl plus Adj 10 | 6.34 | 2.01 |
| TC·HCl plus Adj 34 | 5.76 | 3.85 |
| TC·HCl plus Adj 40 | 6.21 | 4.62 |

EXAMPLE 15

The procedure of Example 1 was repeated using different adjuvants. In the control tests tetracycline hydrochloride was used at the level of 50 milligrams per kilogram of body weight and in the tests with the adjuvants 50 milligrams of tetracycline per kilogram of body weight and 140 milligrams of adjuvant per kilogram of body weight were used. The results are shown in the table below:

TABLE 15

| Substance | Serum levels, mcg./ml. | Mcg./ml. of TC·HCl on same test |
|---|---|---|
| TC·HCl plus Adj 36 | 8.11 | 4.20 |
| TC·HCl plus Adj 26 | 9.22 | 2.90 |
| TC·HCl plus Adj 33 | 7.15 | 1.17 |
| TC·HCl plus Adj 38 | 5.60 | 2.49 |
| TC·HCl plus Adj 37 | 4.12 | 1.17 |

EXAMPLE 16

Demethyltetracycline Phosphinicodilactate

A mixture of 8.6 g. of 6-demethyltetracycline in 350 milliliters of isopropanol was heated to boiling and filtered through a heated filter. To the clear filtrate was added a solution of 10.4 g. of 2,2'-phosphinicodilactic acid in 50 milliters of hot isopropanol. The resulting mixture was cooled in an ice bath and a solid separated. This was filtered and washed first with 50 milliliters of cold isopropanol followed by 3 x 100 milliliters of ether; yield 8.5 grams.

*Analysis.*—Calculated for $C_{27}H_{33}N_2O_{16}P$: C, 48.2; H, 4.9; N, 4.2; P, 4.6. Found: C, 47.5; H, 5.6; N, 4.2; P, 4.6.

EXAMPLE 17

Tetracycline Phosphinicodilactate

To a warm solution of 22.2 g. of tetracycline free base in 500 milliliters of isopropanol was added 26 g. of 2,2'-phosphinicodilatic acid in 100 milliliters of warm isopropanol. On cooling a solid separated; yield, 25.3 grams.

*Analysis.*—Calculated for $C_{28}H_{35}N_2O_{16}P$: C, 49.0; H, 5.1; N, 4.1; P, 4.5. Found: C, 48.4; H, 5.8; N, 3.3; P, 4.8.

EXAMPLE 18

Demethylchlortetracycline Phosphinicodilactate

Five hundred milligrams of demethylchlortetracycline was dissolved in 5 milliliters of isopropanol and 500 milligrams of 2,2'-phosphinicodilactic acid was dissolved in 4 milliliters fo isopropanol, each by heating as necessary. The solutions were mixed and filtered hot and after cooling in ice the product was filtered off and washed with cold isopropanol and ether. Weight 350 milligrams.

*Analysis.*—Calculated for $C_{27}H_{32}N_2ClO_{16}P$: C, 45.9; H, 4.6; Cl, 5.0; P, 4.4. Found: C, 45.96, 45.74; H, 5.40, 5.56; Cl, 4.73; P, 4.26.

In a similar manner by reacting substantially equivalent quantities of oxytetracycline or chlortetracycline with 2,2'-phosphinicodilactic acid, there may be obtained oxytetracycline phosphinicodilactate and chlortetracycline phosphinicodilactate, respectively.

EXAMPLE 19

The procedure of Example 1 was repeated under the same conditions but using the new tetracycline salts of Examples 16, 17 and 18, respectively. The results obtained are shown in the table below:

TABLE 19

| | Blood level conc. in rats, γ/ml. |
|---|---|
| I. Demethylchlortetracycline phosphinicodilactate | 5.8 |
| Demethylchlortetracycline (alone) | 3.0 |
| Demethylchlortetracycline plus 2,2'-phosphinicodilactic acid (mixture) | 4.7 |
| II. Demethyltetracycline phosphinicodilactate | 11.6 |
| Demethyltetracycline (alone) | 6.6 |
| Demethyltetracycline plus 2,2'-phosphinicodilactic acid (mixture) | 8.2 |
| III. Tetracycline phosphinicodilactate | 4.7 |
| Tetracycline (alone) | 3.3 |

It will be observed that the new tetracycline salts gave superior blood levels as compared to the antibiotics alone or in admixture with 2,2'-phosphinicodilactic acid.

This application is, in part, a continuation of our copending application, Serial No. 826,110, filed July 10, 1959, now abandoned.

We claim:

1. A composition of matter comprising a tetracycline antibiotic and as a potentiating agent therefor from 0.1 to 10 parts by weight of a phosphinic acid of the formula:

wherein R is a member of the group consisting of lower alkyl, hydroxylower alkyl, carboxylower alkyl, carboalkoxylower alkyl, cyanolower alkyl, cyanohydroxylower alkyl, carboxyhydroxylower alkyl, carbalkoxyhydroxylower alkyl and hydroxyphenyllower alkyl.

2. A composition according to claim 1 in which the compound is 2,2'-phosphinicodilactic acid.

3. A composition of matter comprising a tetracycline antiobiotic and as a potentiating agent therefor from 0.1 to 10 parts by weight of a phosphonic compound of the formula:

wherein R is a member of the group consisting of phenyl, lower alkoxyphenyl, aminophenyl, halophenyl, hydroxyphenyl, dihydroxyphenyl, lower alkylphenyl, di-lower alkylphenyl, carboxyphenyl, dicarboxyphenyl, phenyl-lower alkyl, styryl, methylpropenyl, furylhydroxymethane, hydroxy lower alkyl, allyl and, hydroxycarboxyl lower alkyl; and $R_1$ is a member of the group consisting of hydrogen and lower alkyl.

4. A composition of matter comprising a tetracycline antibiotic and from 0.1 to 10 parts by weight of tris(2-carboxyethyl)phosphine hydrochloride.

5. A composition of matter comprising a tetracycline antiobiotic and from 0.1 to 10 parts by weight of bis(2-carboxyethyl) phenyl phosphine oxide.

6. A composition of matter for the potentiation of an orally administered tetracycline antiobiotic demethyltetracycline phosphinicodilactate.

7. A composition of matter for the potentiation of an orally administered tetracycline antibiotic, tetracycline phosphinicodilactate.

8. A composition of matter for the potentiation of an orally administered tetracycline antibiotic, demethylchlortetracycline phosphinicodilactate.

9. A composition of matter for the potentiation of an orally administered tetracycline antibiotic, oxytetracycline phosphinicodilactate.

10. A composition of matter for the potentiation of an orally administered tetracycline antibiotic, chlortetracycline phosphinicodilactate.

References Cited in the file of this patent

UNITED STATES PATENTS

| | | |
|---|---|---|
| 2,834,804 | Lecher | May 13, 1958 |
| 2,845,454 | Buckler | July 29, 1958 |
| 2,847,458 | Chao | Aug. 12, 1958 |
| 2,878,289 | McCormick | Mar. 17, 1959 |
| 2,976,318 | Blackwood | Mar. 21, 1961 |
| 3,005,020 | Buckler | Oct. 17, 1961 |

OTHER REFERENCES

Editorial, N. Eng. J. Med., vol. 258, No. 2, page 97, January 9, 1958.